(12) United States Patent
Ohashi et al.

(10) Patent No.: US 7,979,254 B2
(45) Date of Patent: Jul. 12, 2011

(54) SIMULATION APPARATUS AND METHOD FOR NC MACHINING

(75) Inventors: Hajime Ohashi, Aichi pref. (JP);
Kazuhiro Kikata, Aichi pref. (JP);
Morikuni Kimura, Aichi pref. (JP);
Takushi Itogawa, Aichi pref. (JP)

(73) Assignee: Yamazaki Mazak Corporation (JP)

( * ) Notice: Subject to any disclaimer, the term of this patent is extended or adjusted under 35 U.S.C. 154(b) by 213 days.

(21) Appl. No.: 11/224,878

(22) Filed: Sep. 12, 2005

(65) Prior Publication Data

US 2006/0058906 A1    Mar. 16, 2006

(30) Foreign Application Priority Data

Sep. 16, 2004 (JP) .................... 2004-270301

(51) Int. Cl.
*G06G 7/48* (2006.01)
(52) U.S. Cl. ............. 703/7; 700/245; 700/87; 700/189; 703/6; 703/13
(58) Field of Classification Search .............. 700/98, 700/169, 257, 180, 178, 173, 245; 345/473; 707/1; 703/2, 7, 13, 8
See application file for complete search history.

(56) References Cited

U.S. PATENT DOCUMENTS

| | | | | |
|---|---|---|---|---|
| 4,481,591 A * | 11/1984 | Spongh | ................ | 700/257 |
| 4,484,120 A * | 11/1984 | Olex et al. | ................ | 318/568.14 |
| 4,821,201 A | 4/1989 | Kawamura et al. | | |
| 4,833,617 A * | 5/1989 | Wang | ................ | 700/173 |
| 4,888,707 A * | 12/1989 | Shimada | ................ | 700/255 |
| 5,315,523 A * | 5/1994 | Fujita et al. | ................ | 700/180 |
| 5,610,842 A | 3/1997 | Seki et al. | | |
| 5,745,387 A | 4/1998 | Corby, Jr. et al. | | |
| 5,808,432 A * | 9/1998 | Inoue et al. | ................ | 318/561 |
| 6,157,902 A | 12/2000 | Hirata et al. | | |
| 6,219,583 B1 * | 4/2001 | Kinoshita et al. | ................ | 700/3 |
| 6,751,523 B2 * | 6/2004 | Nakamura | ................ | 700/182 |
| 6,856,853 B2 * | 2/2005 | Takahashi et al. | ................ | 700/178 |
| 7,155,303 B2 * | 12/2006 | Sagasaki et al. | ................ | 700/173 |
| 7,174,284 B2 * | 2/2007 | Dolansky et al. | ................ | 703/2 |
| 7,194,396 B2 * | 3/2007 | Watanabe et al. | ................ | 703/7 |

(Continued)

FOREIGN PATENT DOCUMENTS

EP          0083836       7/1983

(Continued)

OTHER PUBLICATIONS

Sridevi Design and Implementation of the MIDAS2 Manufacturing Database System Department of computer Science and Automation, Jan. 1997.*

(Continued)

*Primary Examiner* — Kamini S Shah
*Assistant Examiner* — Cuong V Luu
(74) *Attorney, Agent, or Firm* — Sheridan Ross P.C.

(57) ABSTRACT

A simulation control section 210 of an NC machining simulation apparatus 10 computes a movement path of a mechanical element when performing simulation. A ring buffer 270 memorizes the movement path of the mechanical element. In response to a replay instruction, the simulation control section 210 reads the movement path from the ring buffer 270. The simulation control section 210 then displays the mechanical element on a display device 190 as a solid model based on the movement path for replaying the simulation.

11 Claims, 3 Drawing Sheets

U.S. PATENT DOCUMENTS

| | | | |
|---|---|---|---|
| 2002/0045968 A1* | 4/2002 | Nakamura | 700/182 |
| 2002/0133264 A1* | 9/2002 | Maiteh et al. | 700/182 |
| 2003/0014322 A1* | 1/2003 | Kreidler et al. | 705/26 |
| 2003/0014387 A1* | 1/2003 | Kreidler et al. | 707/1 |
| 2003/0014498 A1* | 1/2003 | Kreidler et al. | 709/217 |
| 2003/0023336 A1* | 1/2003 | Kreidler et al. | 700/108 |
| 2003/0045947 A1* | 3/2003 | Wampler | 700/32 |
| 2003/0078762 A1* | 4/2003 | Hashima et al. | 703/13 |
| 2003/0090490 A1* | 5/2003 | Watanabe et al. | 345/473 |
| 2003/0090491 A1* | 5/2003 | Watanabe et al. | 345/473 |
| 2003/0171841 A1* | 9/2003 | Porter et al. | 700/179 |
| 2003/0236654 A1* | 12/2003 | Flynn et al. | 703/8 |
| 2004/0107018 A1* | 6/2004 | Nakamura | 700/98 |
| 2004/0199288 A1* | 10/2004 | Watanabe et al. | 700/245 |
| 2004/0225405 A1* | 11/2004 | Takahashi et al. | 700/178 |
| 2005/0090929 A1* | 4/2005 | Dolansky et al. | 700/169 |
| 2006/0034535 A1* | 2/2006 | Koch et al. | 382/254 |
| 2006/0152532 A1* | 7/2006 | Sen | 345/629 |

FOREIGN PATENT DOCUMENTS

| | | |
|---|---|---|
| EP | 0250597 | 1/1988 |
| JP | 02096804 | 4/1990 |
| JP | 6-83428 | 3/1994 |
| JP | 09-91017 | 4/1997 |
| JP | 10-105220 | 4/1998 |
| JP | 10-312208 | 11/1998 |
| JP | 2001-147703 | 5/2001 |
| JP | 2002-082704 | 3/2002 |

OTHER PUBLICATIONS

Chinese Office Action dated Dec. 7, 2007 relating to corresponding Chinese Patent Application No. 200510109712.8 (with English translation).

Official Action for Japanese Patent Application No. 2004-270301, dated Aug. 18, 2009 (no translation).

* cited by examiner

SIMULATION APPARATUS AND METHOD FOR NC MACHINING

BACKGROUND OF THE INVENTION

The present invention relates to NC machining simulation apparatuses and methods in which machining is simulated in accordance with an NC machining program.

Conventionally, an NC machining simulation apparatus having a display device is known. The display device displays a tool and a workpiece in accordance with an NC machining program. The apparatus changes the position of the tool and the shape of the workpiece that are displayed on the display device, when necessary. The movement of the tool and the machining state of the workpiece are thus identified through the display device. Using the simulation apparatus, machining is simulated in accordance with the NC machining program before actual operation so as to ensure that a tool movement path defined by the NC machining program is optimal for the machining.

For example, Japanese Laid-Open Patent Publication No. 2002-82704 describes an NC machining simulation apparatus that analyzes an NC machining program successively in accordance with execution blocks. The apparatus includes an image data generation processing section that generates image data successively for each of the execution blocks using pixel data regarding the shape of a tool and the shape of a workpiece in correspondence with tool shape data and workpiece shape data. The tool shape data is stored in a tool data memory and the workpiece shape data is stored in a workpiece shape data memory. The apparatus also includes a block image data memory for storing the image data generated by the image data generation processing section for each execution block. The tool and the shape of the workpiece are displayed on a display device in correspondence with the image data. The positions of the tool and the workpiece relative to each other and the machining state of the workpiece are thus identified by means of the apparatus.

However, the aforementioned document does not address the position of a mechanical element other than the tool including peripheral components such as a workpiece main shaft a main shaft chuck, and a cutter table relative to the position of the tool. Further, other peripheral components including a tool main shaft located in the periphery of the tool and a holder for securing the tool to the tool main shaft may interfere with a different mechanical element.

Therefore, for identifying relative positions, or interference states, of mechanical elements, the NC machining simulation apparatus of the above document may generate image data regarding the tool and the mechanical elements other than the tool for each of the execution blocks. However, since the image data is stored in the block image data memory, the capacity of the memory must be increased correspondingly. Such modification is impractical.

SUMMARY OF THE INVENTION

Accordingly, it is an objective of the present invention to provide a simulation method and a simulation apparatus of NC machining in which the state of interference between two specific mechanical elements is identified reliably and repeatedly without increasing the capacity of a corresponding memory, by memorizing a movement path of a mechanical element.

To achieve the foregoing and other objectives and in accordance with the purpose of the present invention, the invention provides an NC machining simulation method in which machining using a plurality of mechanical elements is simulated in accordance with an NC machining program. The method includes a step of computing a movement path of at least one of the mechanical elements when simulation is being performed, a step of memorizing the movement path, and a step of performing a replay simulation for the at least one of the mechanical elements based on the memorized movement path in response to a replay instruction.

Another aspect of the invention is an NC machining simulation apparatus in which machining using a plurality of mechanical elements is performed in accordance with an NC machining program. The apparatus includes computation means for computing a movement path of at least one of the mechanical elements when simulation is being performed, memory means for memorizing the movement path, and replay means for executing a replay simulation for the at least one of the mechanical elements based on the movement path in response to a replay instruction.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An embodiment of the present invention will now be described with reference to FIGS. 1 to 3.

Figure 1:
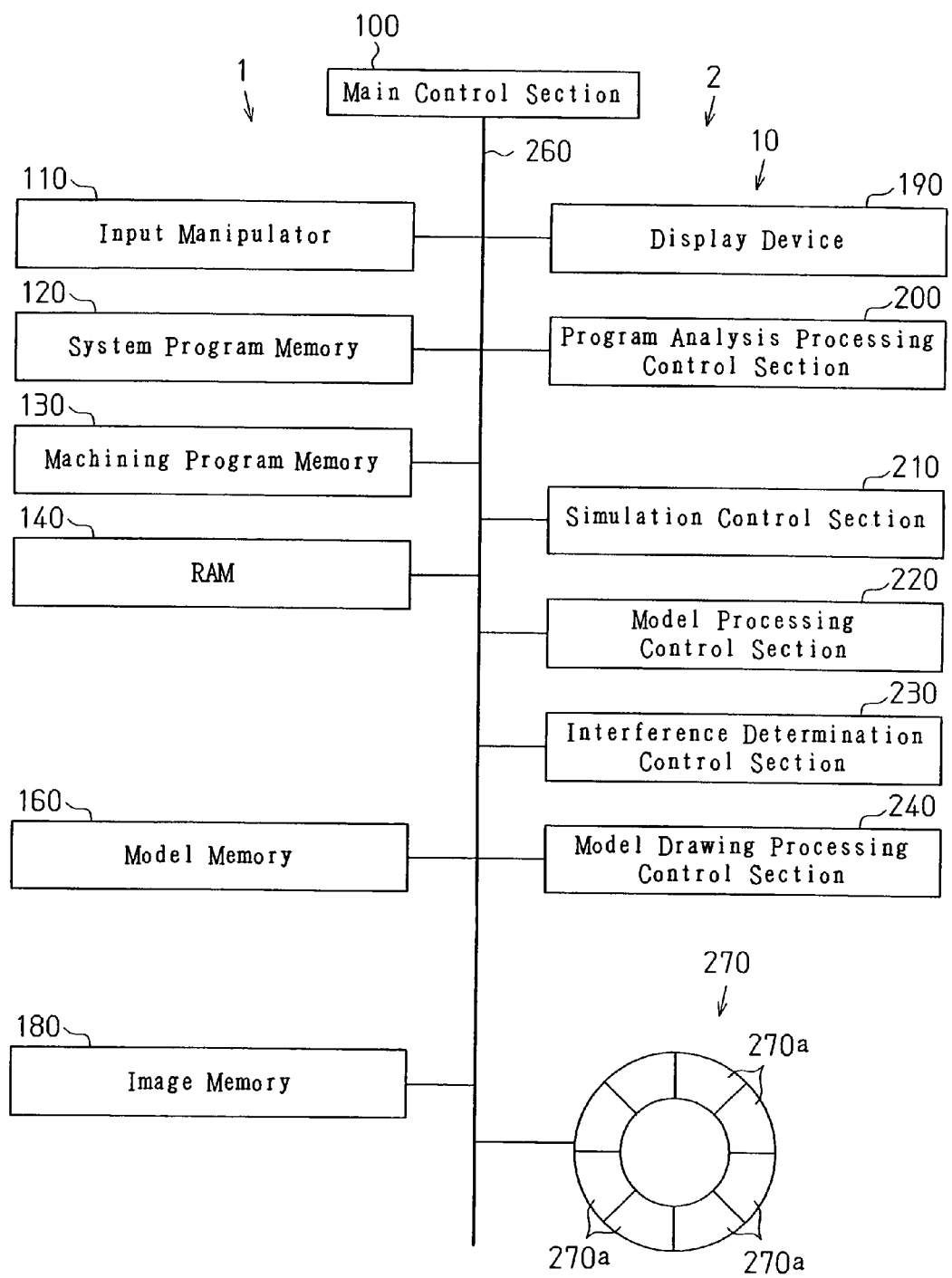
FIG. 1 is a block diagram showing a controller of an NC machining apparatus, which is an example of an NC machining simulation apparatus according to an embodiment of the present invention.

FIG. 1 is a block diagram showing a controller of an NC machining apparatus 1, which is an example of an NC machining simulation apparatus according to an embodiment of the present invention.

As shown in FIG. 1, the NC machining apparatus 1 includes an NC machining simulation apparatus 10, which defines a part of a controller 2 of the NC machining apparatus 1.

As shown in the diagram, the NC machining simulation apparatus 10 includes a main control section 100 formed by a CPU, an input manipulator 110, a system program memory 120, a machining program memory 130, a RAM 140, a model memory 160, an image memory 180, and a display device 190. The NC machining simulation apparatus 10 further includes a program analysis processing control section 200, a simulation control section 210, a model processing control section 220, an interference determination control section 230, a model drawing processing control section 240, and a ring buffer 270. The ring buffer 270 is formed by an RAM including a plurality of memory blocks 270a. Since the ring buffer 270 is presumed to be a loop according to a known addressing method, the ring buffer 270 is depicted to have a loop structure in FIG. 1. As shown in the diagram, a bus 260 connects the aforementioned control sections and memories to the main control section 100 of the NC machining simulation apparatus 10. Each of the control sections including the main control section 100 is formed by a CPU. In FIG. 1, each control section is indicated in accordance with a function block.

The simulation control section 210 corresponds to computation means, replay means, and replay instruction output means. The interference determination control section 230 corresponds to interference determination means. The ring buffer 270 corresponds to memory means for storing a movement path of a mechanical element.

The input manipulator 110 is formed by a keyboard or the like. The system program memory 120 memorizes various programs including a control program for the NC machining apparatus 1 and a known automatic machining program generation program for automatically programming an NC machining program. The keyboard of the input manipulator 110 is manipulated by an operator for inputting different items of machining data in accordance with the automatic program generation program for generating an NC machining program. The main control section 100 thus generates the NC machining program in correspondence with the items of the machining data inputted by the operator, in accordance with the automatic program generation program. The generated program is stored in the machining program memory 130. The NC machining program includes a plurality of continuous steps. Each of the steps includes one or more execution blocks. Each step is defined in correspondence with a tool used for a corresponding machining section of a workpiece. A sequential number is applied to each of the execution blocks for identifying the execution block. The sequential numbers do not necessarily have to be applied to all of the execution blocks but may be applied to particular ones of the execution blocks.

The RAM 140 functions as a working memory when the main control section 100 executes the programs stored in the system program memory 120. The model memory 160 includes a tool model file, a peripheral component model file, and a material model file.

The tool model file stores solid model data of different tools used by the NC machining apparatus 1, or, more particularly, solid model data representing a three-dimensional shape of each of the tools in a state attached to a holder for securing the tool to a tool main shaft.

The peripheral component model file stores solid model data representing a three-dimensional shape of each of the peripheral components used by the NC machining apparatus 1. The peripheral components correspond to the components located in the periphery of a workpiece or a tool. The components arranged in the periphery of the workpiece include a workpiece main shaft, a workpiece holder chuck, a main shaft table, a tailstock, and a workpiece rest. The components disposed in the periphery of each tool include a tool main shaft and a cutter table. The material model file stores solid model data representing the original shape of a workpiece, which has different three-dimensional shapes brought about through machining by the NC machining apparatus 1. The image memory 180 temporarily memorizes image data (drawing data) for drawing an image through the display device 190. The mechanical elements include the tools, the workpiece, and the peripheral components.

The operation of the NC machining simulation apparatus 10 will hereafter be described.

Figure 2:
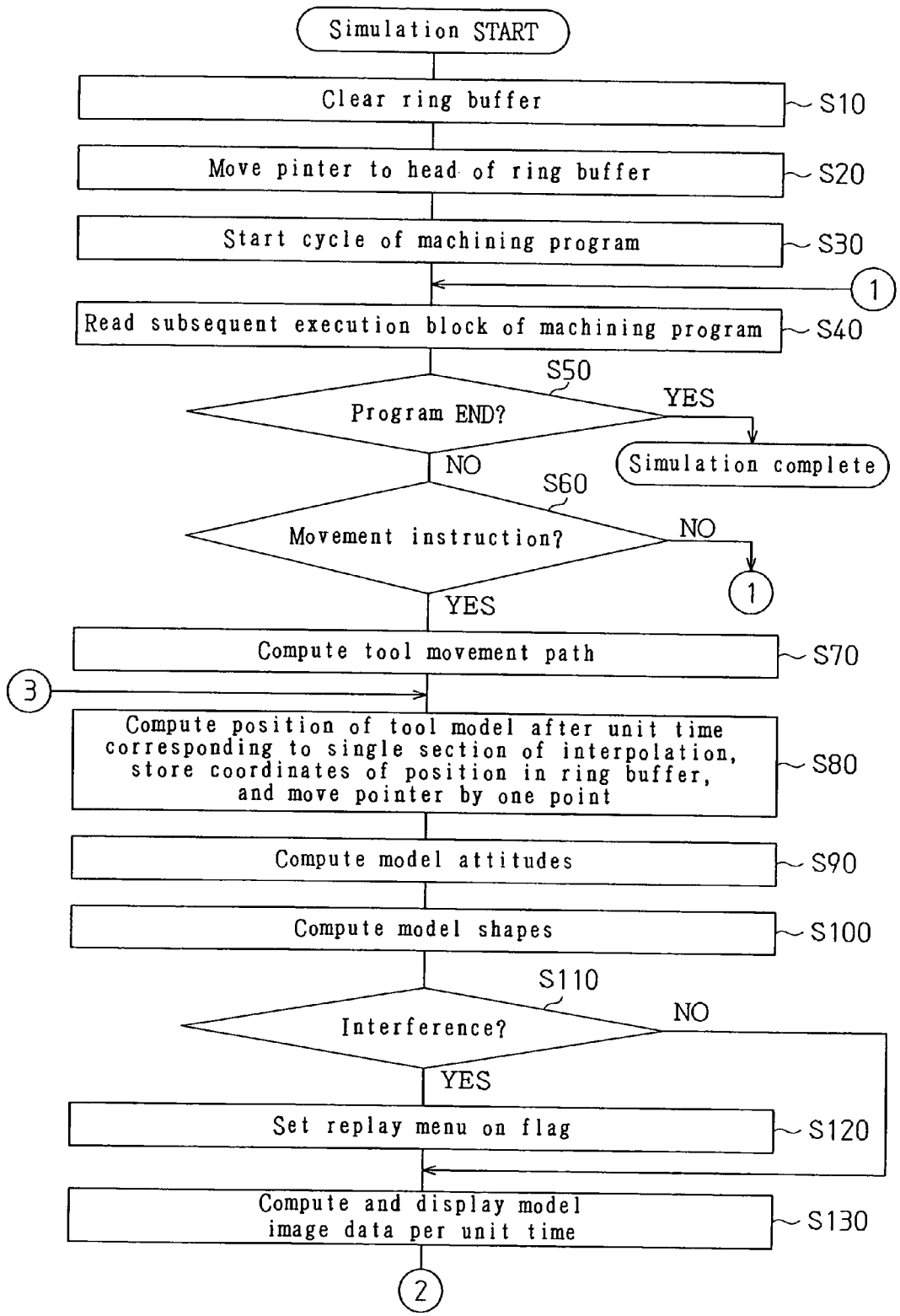
FIG. 2 is a flowchart representing a simulation method performed by the NC machining simulation apparatus.
Figure 3:
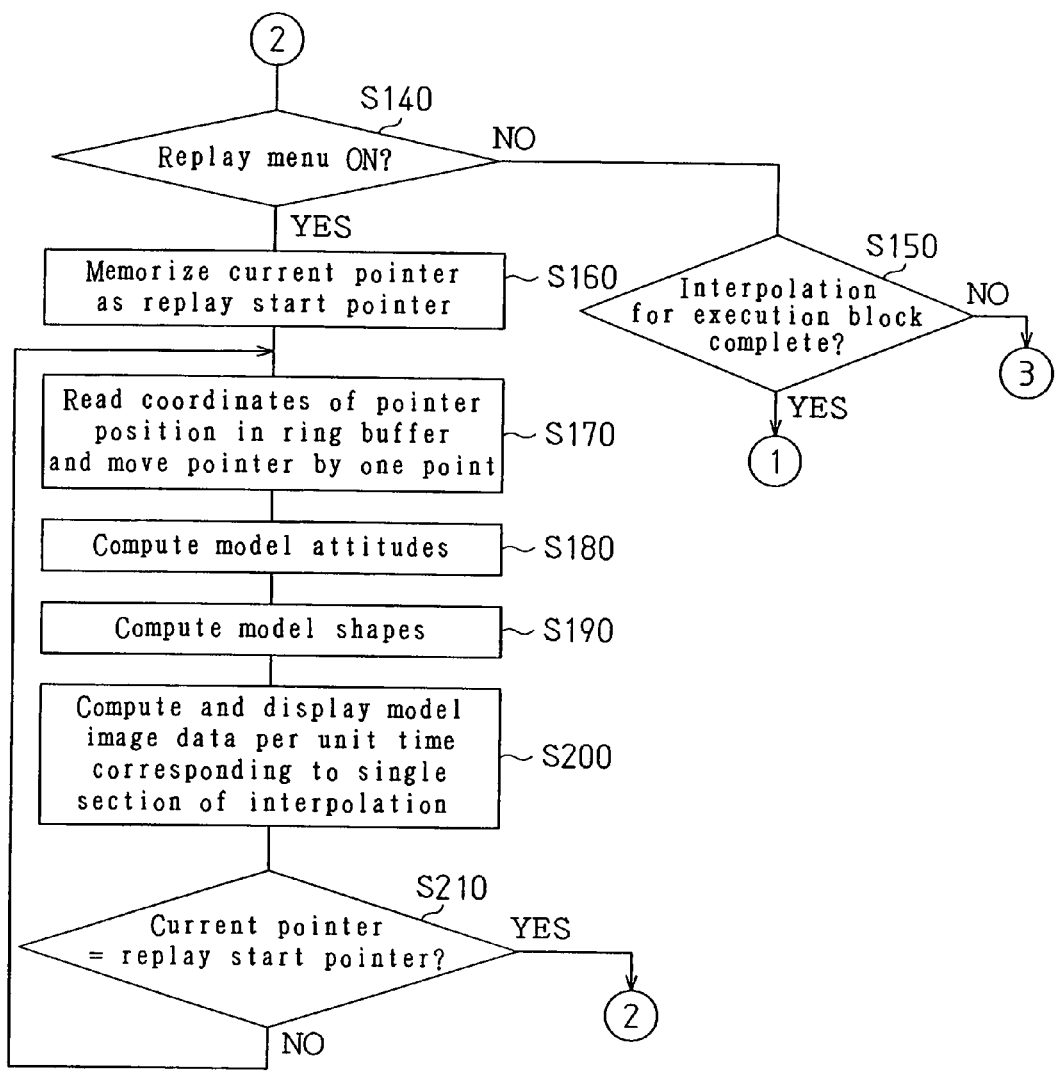
FIG. 3 is a flowchart representing the simulation method performed by the NC machining simulation apparatus.

FIGS. 2 and 3 each show a flowchart of a simulation method performed by the control sections in response to instructions of the main control section 100 of the NC machining simulation apparatus 10.

When a simulation start switch (not shown) provided in the input manipulator 110 is turned on, simulation is started in accordance with an NC machining program stored in the machining program memory 130.

In step S10, in response to a simulation start instruction of the main control section 100 to the simulation control section 210, the simulation control section 210 clears the ring buffer 270. Each of the memory blocks 270*a* of the ring buffer 270 is capable of memorizing position data (values of mechanical coordinate systems in terms of different axes) corresponding to a single section of interpolation defined per unit time in interpolation of a tool movement path, which will be described later. Further, the ring buffer 270 as a whole is capable of memorizing data corresponding to a predetermined time T (for example, 30 seconds). That is, the ring buffer 270 corresponds to memory means for memorizing a series of position data defined for each mechanical element per unit time. Although the time T is defined as, for example, 30 seconds in the illustrated embodiment, the duration of the time T is not restricted to this. Further, although a single unit time is defined as one millisecond in the embodiment, the unit time may be defined in any other suitable manner.

In step S20, the simulation control section 210 moves a writing pointer of the ring buffer to the head of the memory area in the ring buffer. The head of the memory area at which the pointer is located after the ring buffer is cleared is predetermined by the system.

In step S30, the simulation control section 210 starts a cycle of the NC machining program.

In step S40, in response to a control instruction of the simulation control section 210, the program analysis processing control section 200 reads a subsequent execution block of the NC machining program and analyzes the program.

In step S50, if the program analysis processing control section 200 determines that reading of the execution block(s) is complete, the simulation control section 210 suspends the simulation. In contrast, if it is determined that the program analysis processing control section 200 still has an execution block to read, the simulation control section 210 executes step S60.

In step S60, depending on the program analysis of the program analysis processing control section 200, the simulation control section 210 determines whether or not the current execution block includes a movement instruction for the corresponding (machining) tool. If the determination is negative, the simulation control section 210 repeats step S40. If the determination is positive, the simulation control section 210 performs step S70.

In step S70, in correspondence with the execution block including the movement instruction, the simulation control section 210 computes a tool path (in accordance with three-dimensional coordinate system). The tool path starts from a start point (a movement start position) at which the tool is arranged when execution of the instruction of the execution block is started and ends at an end point (a movement end position) at which the tool is arranged when the execution of the instruction is completed. The tool path may be linear or non-linear and corresponds to a movement path of a mechanical element.

In step S80, the simulation control section 210 performs interpolation of the computed tool path per unit time. In other words, the CPU computes the position at which the tool is located after a unit time corresponding to a single section of interpolation (hereinafter, referred to as a current position). The CPU stores data of the computed current position of the tool (the values of the mechanical coordinate system) at the position of the pointer in the ring buffer and moves the pointer forward by one point.

In step S90, in response to a control instruction of the simulation control section 210, the model processing control section 220 computes attitudes of the tool, the workpiece, and the peripheral components at current positions, or model attitudes. The model attitudes include inclination angles and orientations of the tool, the workpiece, and the peripheral components.

In step S100, in response to a control instruction of the simulation control section 210, the model processing control section 220 reads the solid model data of the tool, the workpiece, and the peripheral components from the associated files. The model processing control section 220 then computes model shapes in correspondence with the current and precedent positions of the tool, the workpiece, and the peripheral components and the model attitudes computed in step S90. That is, the model processing control section 220 performs Boolean calculus in terms of the model shapes. Through this computation, the shape of the workpiece is altered in accordance with machining by the tool. Further, it is determined whether or not a certain mechanical element interferes with a different mechanical element, or, for example, a certain peripheral component of the workpiece interferes with the tool.

In step S110, in response to a control instruction of the simulation control section 210, the interference determination control section 230 determines whether or not interference occurs between machine tools other than between the tool and the workpiece in correspondence with the result of step S100.

More specifically, the interference may occur between the holder for holding the tool and the workpiece, or between the chuck for holding the workpiece and the tool, or between the chuck and the holder. Step S100 corresponds to a determination step.

If the determination of step S110 is positive, or the interference determination control section 230 determines that the interference occurs between the mechanical elements other than between the tool and the workpiece, step S120 is executed. In contrast, if the determination of step S230 is negative, or it is determined that such interference does not occur, step S130 is executed.

In step S120, the simulation control section 210 sets a replay menu ON flag, in response to the positive determination of step S110.

In step S130, in response to a control instruction of the simulation control section 210, the model drawing processing control section 240 performs drawing processing (such as hidden-surface processing and shading) regarding the solid models of the tool, the workpiece, the peripheral components, which have been subjected to computation of the model shapes in step S100. In this manner, the drawing data is generated. The model drawing processing control section 240 temporarily stores the generated drawing data in the image memory 180. The main control section 100 displays an image on the display device 190 in correspondence with the drawing data.

The model processing control section 220 computes modification to the shape of the workpiece when each of the execution blocks of the NC machining program is executed. The shape of the workpiece is displayed on the screen of the display device 190 in such a manner as to reflect the modification. Further, the screen of the display device 190 displays models of peripheral components including jigs provided in the periphery of the workpiece, such as the chuck for holding the workpiece.

In step S140, the simulation control section 210 determines whether or not the replay menu ON flag is set. If the determination is negative, step S150 is executed.

In step S150, the simulation control section 210 determines whether or not the interpolation for the corresponding execution block is complete. If the determination of step S150 is negative, step S80 is repeated. The simulation control section 210 repeatedly executes step S80 and the subsequent steps until display for the execution block is complete.

If, in step S150, the simulation control section 210 determines that the interpolation for the corresponding execution block is complete, step S40 is executed.

If it is determined that the replay menu ON flag is set in step S140, or the determination of step S140 is positive, the simulation control section 210 determines that there is a replay instruction. Step S160 is thus executed.

In step S160, the simulation control section 210 memorizes the current pointer position as a replay start pointer.

In step S170, the simulation control section 210 reads the current positions of the tool and the workpiece, or the values of the mechanical coordinate system, from the memory block 270a in correspondence with the pointer position. The current pointer is thus moved forward by one point. In step S180, the model processing control section 220 computes the model attitudes, as in step S90.

Subsequently, in step S190, in response to a control instruction of the simulation control section 210, the model processing control section 220 computes the model shapes as in step S100.

In step S200, in response to a control instruction of the simulation control section 210, the model drawing processing control section 240 performs the drawing processing (such as hidden-surface processing and shading) regarding the solid models of the tool, the workpiece, the peripheral components, which have been subjected to computation of the model shapes in step S190. In this manner, the drawing data of the models per unit time corresponding to a single section of interpolation is generated. The model drawing processing control section 240 temporarily stores the generated drawing data in the image memory 180. The main control section 100 displays an image on the display device 190 in correspondence with the drawing data.

In step S210, the simulation control section 210 determines whether or not the current pointer coincides with the replay start pointer memorized in step S160. If the determination is negative, step S170 is executed. If the determination is positive, step S140 is repeated.

Accordingly, the NC machining simulation apparatus 10 is capable of determining whether or not interference is caused between the tool and any peripheral component of the workpiece, or between any peripheral component of the tool and the workpiece, or between any peripheral component of the tool and any peripheral component of the workpiece.

If such interference occurs (YES in step S110), the replay menu ON flag is set. The determination of step S140 is thus YES. Therefore, the procedure corresponding to steps S170 to S210 is repeated for confirming the determination of the interference. In the procedure, the tool, the workpiece, and the peripheral components are continuously displayed on the screen of the display device 190 while the current pointer is being incremented, or for a predetermined time T (in the illustrated embodiment, for thirty seconds), from when it is determined that such interference is caused. In other words, the replay is started the time T (in the embodiment, thirty seconds) before the determination of the interference is confirmed.

The replay lasting for the time T can be repeated for multiple times until it is determined in step S140 that the replay menu ON flag is canceled, or the replay instruction is suspended.

In the replay, the operator is allowed to confirm the interference state of the mechanical elements from multiple points of view by changing the point of view with respect to the mechanical elements such as the tool and the peripheral components, which are displayed as the three-dimensional solid models, through the input manipulator 110. Such interference state is thus observed in detail. The input manipulator 110 corresponds to view point changer means.

Since steps S70 and S80 are suspended during the replay, the load of the simulation control section 210 is reduced.

The replay is stopped by resetting the replay menu ON flag through manipulation of the keyboard of the input manipulator 110.

The replay menu ON flag can be manually set for starting the replay at a desired position.

Since the NC machining simulation apparatus 10 memorizes the movement path of the tool, a memory device for storing a corresponding image data is unnecessary. Therefore, compared to a case in which the image data is memorized, the memory capacity of the NC machining simulation apparatus 10 is advantageously reduced.

The present invention is not restricted to the illustrated embodiment but may be embodied in the following modified forms.

In the illustrated embodiment, the present invention is applied to the NC machining apparatus, which is an example of the NC machining simulation apparatus. However, the present invention may be embodied as an independent NC machining simulation apparatus.

In the illustrated embodiment, the tool path is selected as a movement path of a mechanical element. However, such path is not restricted to the tool path. For example, although the description of the illustrated embodiment does not include detailed explanation of the NC machining apparatus 1, the NC machining apparatus 1 may include a plurality of tool main shafts and a plurality of workpiece main shafts. That is, there may be different types of NC machining apparatuses that include a shaft X, a shaft Y, a shaft Z, and a shaft C, for example, which are controlled by the apparatuses. In these NC machining apparatuses, at least one of the tool and the workpiece moves when machining is carried out.

Accordingly, if the present invention is embodied as an NC machining simulation apparatus for one such NC machining apparatus, the procedure corresponding to steps S60 to S80 are modified as follows.

In step S60, the movement instruction is generated for the at least one of the tool and the workpiece.

Correspondingly, in step S70, the movement path of the at least one of the tool and the workpiece is computed in accordance with the three-dimensional coordinate system. The path of the workpiece starts from a start point (a movement start position) at which the workpiece is located when execution of the corresponding execution block is started and ends at an end point (a movement end position) at which the workpiece is located when such execution is complete. In this case, the movement path of the tool or the workpiece corresponds to the movement path of the mechanical element.

In step S80, the simulation control section 210 performs interpolation of the computed movement path of the tool or the workpiece per unit time. Data regarding the computed current position of the tool or the workpiece (the values of the mechanical coordinate system) is stored at the pointer position in the ring buffer. The pointer is thus moved forward by one point.

In this case, if the shafts are provided in a relatively large quantity, the peripheral components of the tool main shaft and those of the workpiece main shaft are correspondingly provided in a relatively large quantity. This makes it easy for the operator to execute the replay if it is determined that interference between mechanical elements occurs in execution of the NC machining program.

The present examples and embodiments are to be considered as illustrative and not restrictive and the invention is not to be limited to the details given herein, but may be modified within the scope and equivalence of the appended claims.

The invention claimed is:

1. An NC machining simulation method in which machining using a plurality of mechanical elements is simulated in accordance with an NC machining program, comprising the steps of:
    computing at least one of movement paths corresponding to at least one of the mechanical elements when simulation is being performed;
    memorizing the movement paths;
    performing a replay simulation for the mechanical elements based on the memorized movement paths in response to a replay instruction, wherein a current pointer position of the at least one of the mechanical elements is memorized as a replay start pointer position, wherein coordinates of the current pointer position of the at least one of the mechanical elements are read in a ring buffer, and the current pointer position is moved by one point, and wherein the replay simulation lasting for a predetermined time, which is based on the movement paths that have been memorized immediately before the replay instruction is given, is repeated from when the replay instruction is given until when the current pointer position is equal to the replay start pointer position and the replay instruction is suspended;
    displaying the mechanical elements when the replay simulation is being performed; and
    changing a point of view with respect to the mechanical elements in the replay simulation so that an operator is allowed to confirm the interference state of the mechanical elements from multiple points of view,
    wherein the NC machining simulation method memorizes the at least one path movement without the necessity of storing a corresponding image data and therefore a memory capacity required of the NC machining simulator is advantageously reduced compared to a case in which the corresponding image data is memorized.

2. The method according to claim 1, wherein the movement paths of the mechanical elements includes a series of position data defined for the mechanical elements per unit time.

3. The method according to claim 1, further comprising the steps of:
    determining whether or not interference is caused between two specific mechanical elements when the simulation is being performed; and
    generating the replay instruction if it is determined in the determination step that the interference is caused.

4. An NC machining simulation apparatus in which machining using a plurality of mechanical elements is performed in accordance with an NC machining program, comprising:

computation means for computing at least one of movement paths corresponding to at least one of the mechanical elements when simulation is performed;

memory means for memorizing the movement paths;

replay means for executing a replay simulation for the mechanical elements based on the movement paths in response to a replay instruction, wherein a current pointer position of the at least one of the mechanical elements is memorized as a replay start pointer position, wherein coordinates of the current pointer position of the at least one of the mechanical elements are read in a ring buffer, and the current pointer position is moved by one point, and wherein the replay simulation lasting for a predetermined time, which is based on the movement paths that have been memorized immediately before the replay instruction is given, is repeated from when the replay instruction is given until when the current pointer position is equal to the replay start pointer position and the replay instruction is suspended;

a display device that displays the mechanical elements when the replay simulation is being performed; and changer means for changing a point of view with respect to the mechanical elements in the replay simulation so that an operator is allowed to confirm the interference state of the mechanical elements from multiple points of view on the display device;

wherein the NC machining simulation method memorizes the at least one path movement without the necessity of storing a corresponding image data and therefore a memory capacity required of the NC machining simulator is advantageously reduced compared to a case in which the corresponding image data is memorized.

5. The apparatus according to claim 4, comprising:

determination means for determining whether or not interference is caused between two specific mechanical elements; and output means for outputting the replay instruction if it is determined by the determination means that the interference is caused.

6. The apparatus according to claim 4, wherein the computation means suspends the computation when the replay simulation is being performed by the replay means.

7. The apparatus according to claim 4, wherein the memory means is formed by a ring buffer.

8. An NC machining simulation apparatus in which machining using a plurality of mechanical elements is performed in accordance with an NC machining program, comprising:

a computation device for computing at least one of movement paths corresponding to at least one of the mechanical elements when simulation is being performed;

a memory for memorizing the movement paths;

a replay device for executing a replay simulation for the mechanical elements based on the movement paths in response to a replay instruction, wherein a current pointer position of the at least one of the mechanical elements is memorized as a replay start pointer position, wherein coordinates of the current pointer position of the at least one of the mechanical elements are read in a ring buffer, and the current pointer position is moved by one point, and wherein the replay simulation lasting for a predetermined time, which is based on the movement paths that have been memorized immediately before the replay instruction is given, is repeated from when the replay instruction is given until when the current pointer position is equal to the replay start pointer position and the replay instruction is suspended;

a display device that displays the mechanical elements when the replay simulation is being performed; and an input manipulator that is provided for changing a point of view with respect to mechanical elements in the replay simulation so that an operator is allowed to confirm the interference state of mechanical elements from multiple points of view on the display device wherein the NC machining simulation apparatus memorizes the at least one path movement without the necessity of storing a corresponding image data and therefore a memory capacity required of the NC machining simulator apparatus is advantageously reduced compared to a case in which the corresponding image data is memorized.

9. The apparatus according to claim 8, comprising:

a determination device for determining whether or not interference is caused between two specific mechanical elements; and an output device for outputting the replay instruction if it is determined by the determination device that the interference is caused.

10. The apparatus according to claim 8, wherein the computation device suspends the computation when the replay simulation is being performed by the replay means.

11. The apparatus according to claim 8, wherein the memory is formed by a ring buffer.

* * * * *